United States Patent
Rawlinson

(10) Patent No.: US 9,022,402 B1
(45) Date of Patent: *May 5, 2015

(54) COMPACT REAR SUSPENSION DAMPER-SPRING ASSEMBLY

(71) Applicant: Atieva, Inc., Redwood City, CA (US)

(72) Inventor: Peter Dore Rawlinson, Worcestershire (GB)

(73) Assignee: Atieva, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,511

(22) Filed: Oct. 13, 2014

Related U.S. Application Data

(63) Continuation-in-part of application No. 14/177,412, filed on Feb. 11, 2014, which is a continuation-in-part of application No. 14/172,147, filed on Feb. 4, 2014, now Pat. No. 8,905,416.

(51) Int. Cl.
  *B60G 15/00* (2006.01)
  *B60G 3/20* (2006.01)
  *B60G 13/00* (2006.01)

(52) U.S. Cl.
  CPC *B60G 15/00* (2013.01); *B60G 3/20* (2013.01); *B60G 13/006* (2013.01); *B60G 2200/144* (2013.01); *B60G 2204/128* (2013.01)

(58) Field of Classification Search
  CPC ........ B60G 15/00; B60G 3/20; B60G 13/006; B60G 2200/144; B60G 2204/128
  See application file for complete search history.

(56) References Cited

U.S. PATENT DOCUMENTS

| | | | |
|---|---|---|---|
| 4,883,288 A | 11/1989 | Finn et al. | |
| 5,868,410 A * | 2/1999 | Kawabe et al. | 280/124.15 |
| 6,036,201 A * | 3/2000 | Pond et al. | 280/5.514 |
| 6,250,659 B1 | 6/2001 | Morris | |
| 7,168,717 B2 | 1/2007 | Wubben et al. | |
| 8,534,686 B1 | 9/2013 | Slawson | |
| 2005/0110235 A1* | 5/2005 | LeBlanc et al. | 280/124.135 |
| 2005/0200094 A1* | 9/2005 | Hozumi | 280/124.135 |
| 2006/0055141 A1 | 3/2006 | Geusens | |
| 2010/0117320 A1* | 5/2010 | Grozev et al. | 280/124.16 |
| 2012/0043736 A1* | 2/2012 | Okamoto et al. | 280/124.135 |

* cited by examiner

*Primary Examiner* — Faye M Fleming
(74) *Attorney, Agent, or Firm* — Patent Law Office of David G. Beck

(57) ABSTRACT

A vehicle wheel suspension system that achieves increased width in the passenger and/or luggage compartment is provided. The suspension system utilizes a (i) a wheel support member that is positioned between the inner and outer tire planes; (ii) a plurality of linkage arms rotatably coupled to the wheel support member; (iii) a nonlinearly-shaped damper-spring support member that is attached to either an upper or lower linkage arm (iv) a damper-spring mounting platform that is positioned above, and at least partially overlaps, the tire, and that is rotatably attached to the nonlinearly-shaped damper-spring support member; and (v) a damper-spring assembly mounted to the damper-spring mounting platform and coupled to a vehicle body structure.

20 Claims, 8 Drawing Sheets

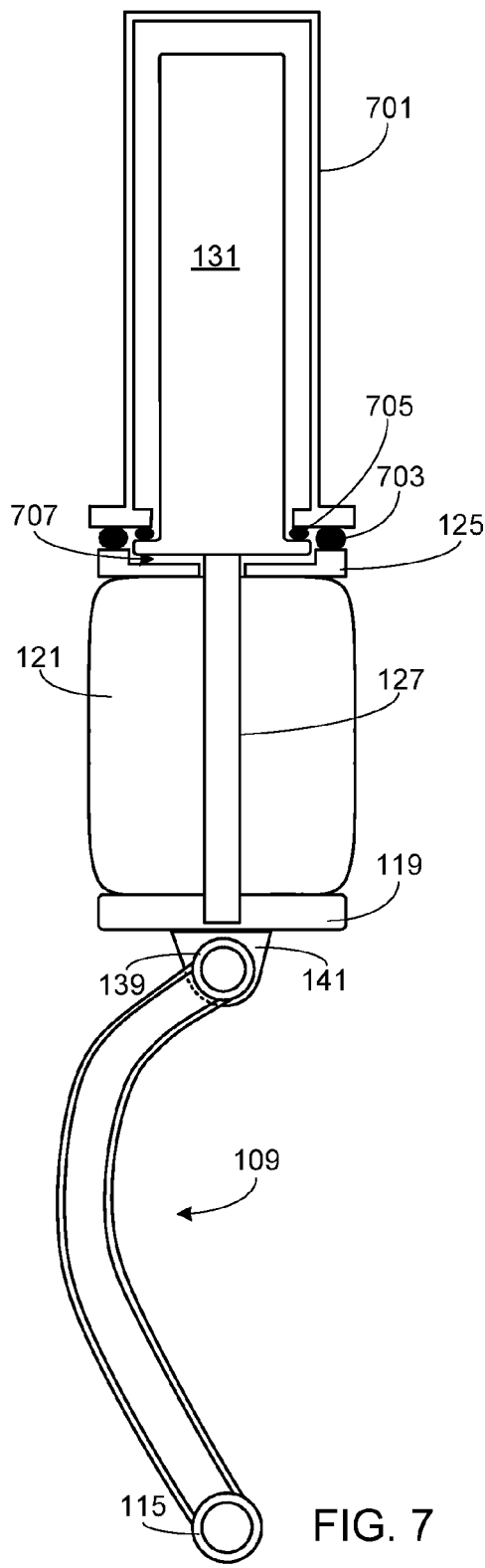
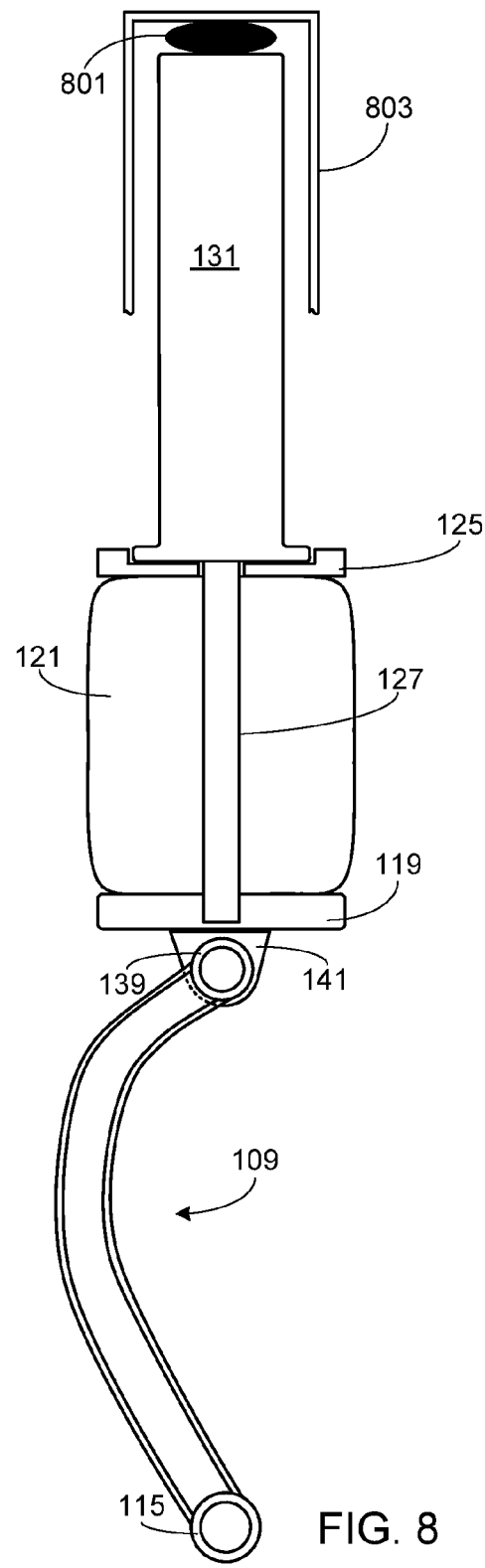
FIG. 7
FIG. 8

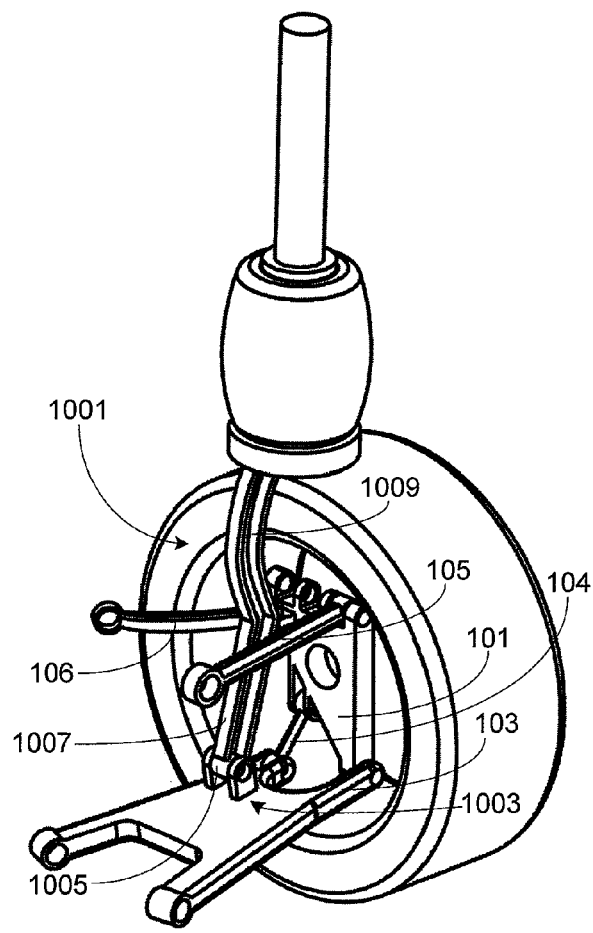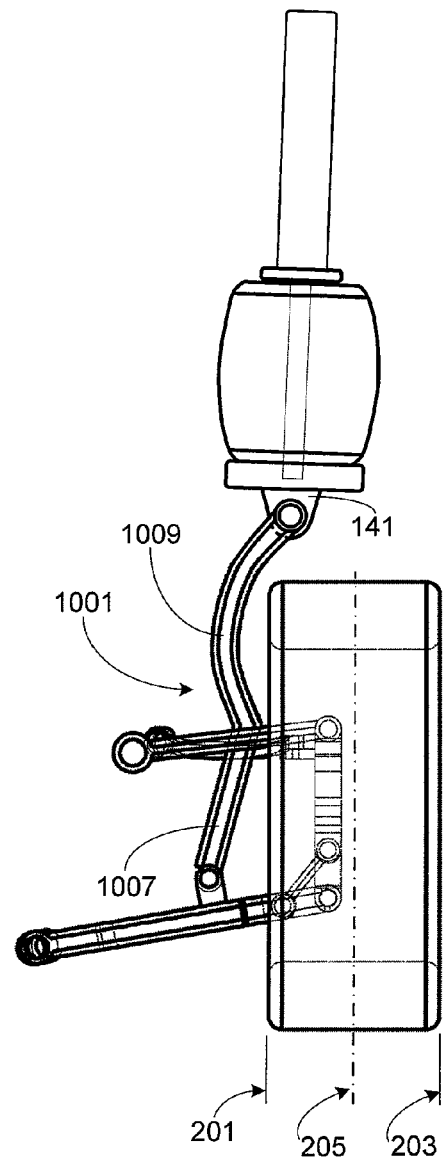
FIG. 10
FIG. 11

COMPACT REAR SUSPENSION DAMPER-SPRING ASSEMBLY

CROSS-REFERENCE TO RELATED APPLICATION

This application is a continuation-in-part of U.S. patent application Ser. No. 14/177,412, filed 11 Feb. 2014, which is a continuation-in-part of U.S. patent application Ser. No. 14/172,147, filed 4 Feb. 2014, the disclosures of which are incorporated herein by reference for any and all purposes.

FIELD OF THE INVENTION

The present invention relates generally to automobiles and, more particularly, to a rear suspension damper-spring assembly.

BACKGROUND OF THE INVENTION

When configuring a vehicle's suspension, the primary considerations for the automobile designer are the design goals set for passenger ride comfort and overall vehicle performance. In general the designer first selects the type of suspension required by the style of vehicle, i.e., high performance car, luxury sedan, compact economy car, SUV, etc., and then configures and adjusts the selected type of suspension to meet the specific design goals set for the vehicle.

Various suspension types exist, each of which provides specific driving characteristics. One common characteristic of each type of suspension, however, is the in-board mounting of the damper and spring assembly regardless of whether or not the damper and spring are coaxially mounted. This in-board mounting scheme is illustrated in the torsion beam rear wheel suspension system disclosed in U.S. Pat. No. 7,946,600. In this system one end of each arm of a pair of trailing arms is pivotally supported by the vehicle body via a rubber bush joint. The other end of each trailing arm extends outward and rearward and supports the corresponding rear wheel via a hub bearing unit. At intermediate locations, the two trailing arms are connected to, and separated by, a torsion beam. Located between the torsion beam coupling and the hub bearing unit of each trailing arm is a spring seat, thus providing means for resiliently supporting the trailing arm with a coil spring interposed between the spring seat and the vehicle body. A damper, located behind the coil spring, extends between the corresponding trailing arm and the vehicle body. A similar suspension configuration is disclosed for use with an in-wheel motor in U.S. Pat. No. 8,220,808.

A different type of suspension, typically referred to as a multi-link suspension, is disclosed in U.S. Pat. No. 6,938,908. In the disclosed suspension assembly each wheel support is connected to the vehicle body using five links. A coaxially arranged damper-coil spring assembly is interposed between the vehicle body and an inward projection of the wheel support. When viewed from the side, the damper-coil spring assembly extends in a substantially vertical direction while the assembly, when viewed from the rear, angles slightly inward towards the vehicle's centerline. A similar suspension configuration is disclosed in U.S. Pat. No. 5,507,510.

Yet another type of suspension, commonly referred to as a double wishbone suspension, is disclosed in U.S. Pat. No. 6,945,541. In this type of suspension the wheel mount is coupled to upper and lower control arms via ball joints, where each substantially horizontal control arm is approximately parallel to the road surface. A coaxial damper-spring assembly is interposed between the wheel mount and the vehicle body and positioned such that it is substantially vertical when viewed from the side, and angled inwards towards the vehicle's centerline when viewed from the rear.

Regardless of the type of suspension, in general the damper-spring assembly angles inwardly towards the vehicle's centerline when viewed from the rear of the car. The degree to which the assembly intrudes upon either the passenger compartment or the luggage compartment depends both on the angle of the assembly and the mounting location of the assembly relative to the wheel mount. The configuration of the assembly, for example whether or not the damper and spring are coaxially mounted and where the spring is mounted relative to the damper and wheel mount, also impacts the degree of interior space intrusion. Accordingly, what is needed is a damper-spring assembly that minimizes interior space intrusion while still achieving the desired level of ride comfort and vehicle performance. The present invention provides such a damper-spring assembly.

SUMMARY OF THE INVENTION

The present invention provides a vehicle wheel suspension system that achieves increased width in the passenger and/or luggage compartment while still providing optimal ride characteristics. The wheel suspension system is comprised of (i) a wheel support member that is positioned between the inner and outer tire planes, and preferably in-board of the tire centerline, and that is configured to support a wheel-carrying spindle and that includes a plurality of mounts; (ii) a plurality of rotatably connected linkage arms coupled to the plurality of mounts on the wheel support member; (iii) a nonlinearly-shaped damper-spring support member, where the first end of the support member, which may be comprised of a bushing collar, is attached to one of the linkage arms (e.g., either an upper linkage arm or a lower linkage arm); (iv) a damper-spring mounting platform, where the second end of the non-linearly-shaped damper-spring support member, which may be comprised of a bushing collar, is rotatably connected to the damper-spring mounting platform, and where the damper-spring mounting platform is positioned above and at least partially overlaps a tire coupled to the wheel-carrying spindle; and (v) a damper-spring assembly, comprised of a damper and a spring, mounted to the damper-spring mounting platform and coupled to a vehicle body structure. Preferably at least 50 percent of the damper-spring mounting platform and at least 50 percent of the spring extends beyond the inner tire plane towards the tire centerline. The damper and spring comprising the damper-spring assembly are preferably coaxially mounted; alternately, the damper may be misaligned and offset relative to the spring. The spring of the damper-spring assembly may rest on the damper-spring mounting platform, and preferably be captured between the damper-spring mounting platform and a spring retaining member, while the damper rod may pass through the spring and be coupled, e.g., bolted, to the damper-spring mounting platform. The spring of the damper-spring assembly may be comprised of an air spring or a coil spring. The element that connects the first end to the second end of the nonlinearly-shaped damper-spring support member may be comprised of at least one straight segment and at least one curved segment; alternately, of a single continuously curved segment; alternately, of multiple straight segments.

A further understanding of the nature and advantages of the present invention may be realized by reference to the remaining portions of the specification and the drawings.

BRIEF DESCRIPTION OF THE DRAWINGS

FIG. 7 schematically illustrates the primary components associated with the damper-spring assembly shown in FIGS. 1 and 2;

FIG. 8 schematically illustrates an alternate vehicle mounting configuration;

FIG. 10 provides a perspective view of an alternate damper-spring assembly in which the damper-spring assembly is coupled to a lower linkage arm;

FIG. 11 provides a front view of the damper-spring assembly shown in FIG. 10;

DESCRIPTION OF THE SPECIFIC EMBODIMENTS

Figure 1:
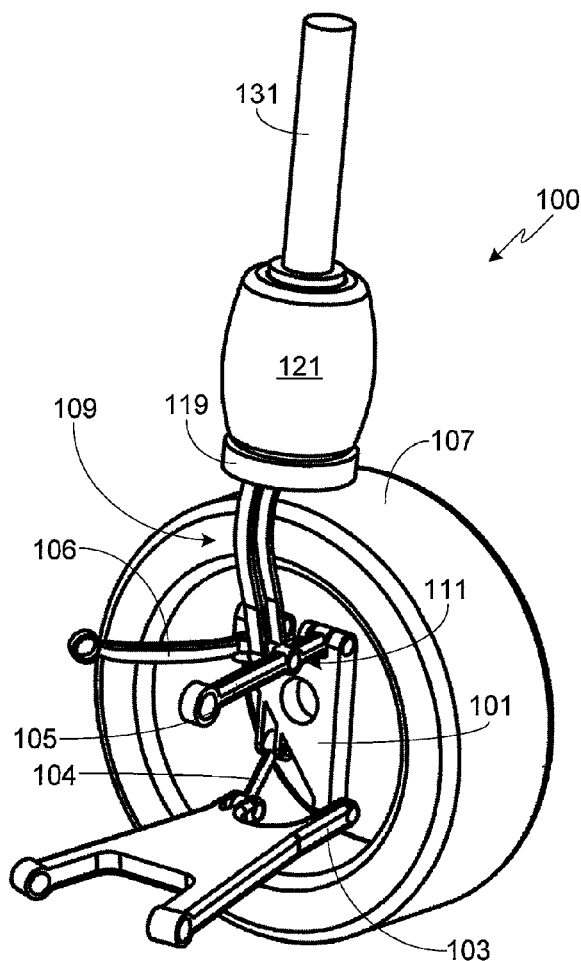
FIG. 1 provides a perspective view of a damper-spring assembly in accordance with a preferred embodiment of the invention.
Figure 2:
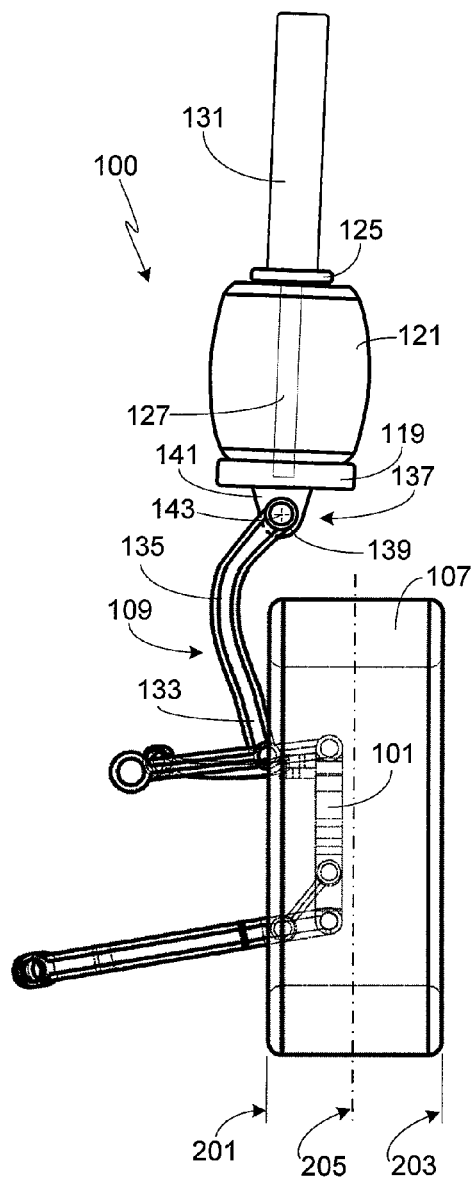
FIG. 2 provides a front view of the damper-spring assembly shown in FIG. 1.

FIGS. 1 and 2 provide perspective and front views, respectively, of a multi-link vehicle suspension assembly 100 configured to achieve superior ride characteristics while providing increased width in the passenger and/or luggage compartment. Assembly 100 includes a wheel support member 101 that is configured to support a wheel-carrying spindle, not shown. In the illustrated embodiment, wheel support member 101 includes multiple mounts for rotatably coupling wheel support member 101 to the vehicle body via multiple linkage arms, i.e., links, 103-106. Although the wheel-carrying spindle is not shown, tire 107 is included in the figures in order to clearly indicate that the wheel support member 101 is located between inner tire plane 201 and outer tire plane 203 of tire 107, and preferably in-board of tire centerline 205. In other words, relative to tire centerline 205, member 101 is located closer to inner tire plane 201 and the vehicle's centerline rather than closer to outer tire plane 203 and the outer envelope of the vehicle.

Figure 3:
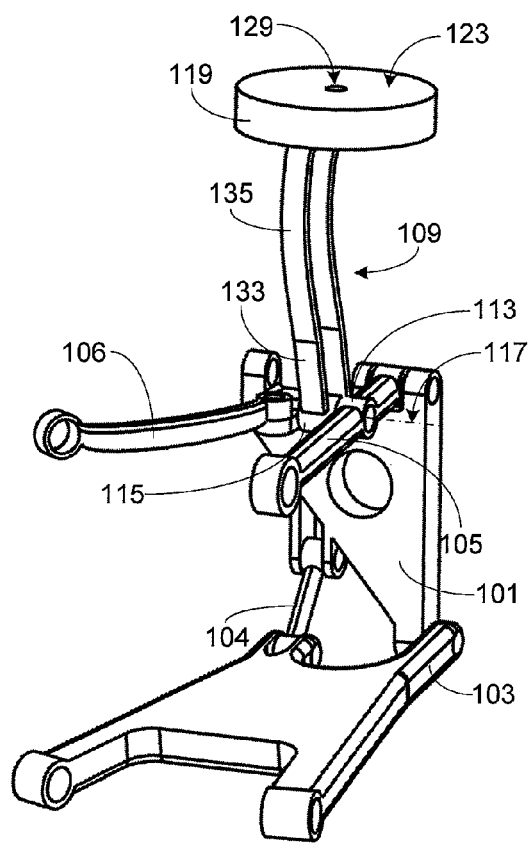
FIG. 3 provides a detailed perspective view of the linkage assembly of FIGS. 1 and 2, with the inclusion of the nonlinearly-shaped damper-spring support member.
Figure 4:
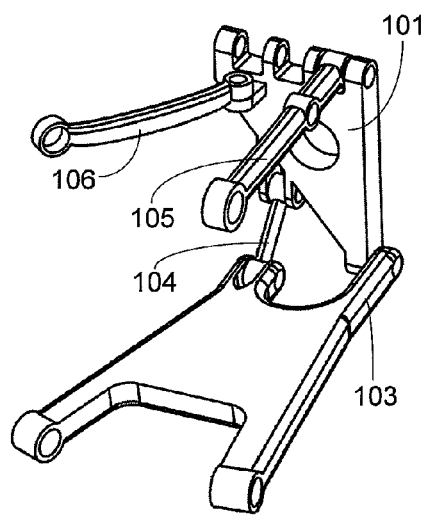
FIG. 4 provides a detailed perspective view of the linkage assembly of FIGS. 1 and 2, without the inclusion of the nonlinearly-shaped damper-spring support member.

Coupled to one of the upper linkage arms, and specifically coupled to linkage arm 105 in the illustrated embodiment, is a nonlinearly-shaped damper-spring support member 109. FIGS. 3 and 4 provide a detailed perspective view of the linkage assembly with and without damper-spring support member 109, respectively. The lower end of member 109 is rotatably connected to upper linkage arm 105 via a rotational connection generally designated 111. Although a variety of rotational connections 111 are contemplated that would allow member 109 to pivot about the upper linkage, in the preferred and illustrated embodiment a bushing within collar 113 of linkage arm 105 and collar 115 of support member 109 is captured by a pin or bolt fastener (not visible), thus allowing the damper-spring support 109 to rotate about axis 117. In an alternate embodiment, rotational connection 111 is comprised of a ball joint.

The upper end of member 109 is rotatably connected to a damper-spring mounting platform 119 via a rotational connection generally designated 137. A variety of rotational connections 137 are contemplated that would allow mounting platform 119 and the attached damper-spring assembly to pivot about member 109, although in the preferred and illustrated embodiment a bushing within collar 139 is captured by a pin or bolt fastener (not visible) within mount 141 of mounting platform 119, thus allowing the damper-spring assembly attached to platform 119 to rotate about axis 143 of member 119. In an alternate embodiment, rotational connection 137 is comprised of a ball joint.

In the preferred embodiment, the lower end of spring 121 rests on surface 123 of platform 119, and is captured between mounting platform 119 and a spring retaining member 125. The inventor envisions that spring 121 may consist of either a coil spring or an air spring. The damper rod 127 is coupled to mounting platform 119, preferably by bolting the damper rod to mounting platform 119 via through a threaded hole 129. Preferably damper 131 and spring 121 are coaxially mounted to mounting platform 119.

Figure 5:
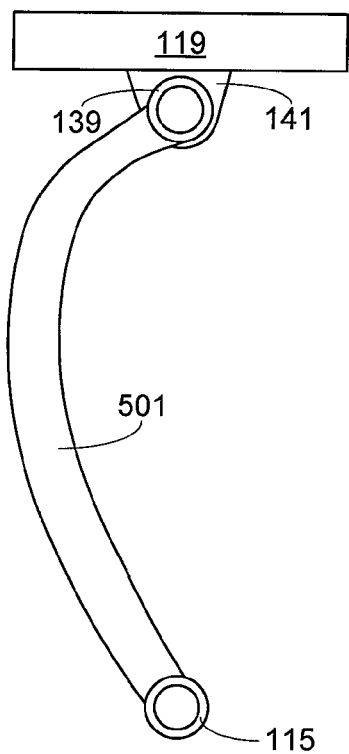
FIG. 5 provides a side view of an alternate damper-spring support member comprised of a continuously-curved element interposed between the rotational coupling and the spring platform.
Figure 6:
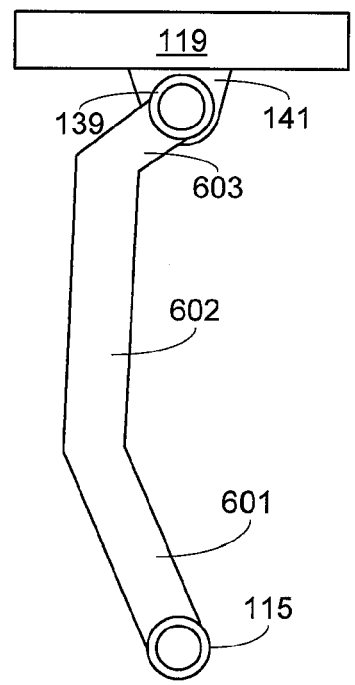
FIG. 6 provides a side view of an alternate damper-spring support member comprised of a series of straight elements interposed between the rotational coupling and the spring platform.

In the preferred embodiment, nonlinearly-shaped member 109 is comprised of a straight portion 133 and a curved portion 135. It should be appreciated, however, that the shaped member may also be comprised of a continuously curved member 501 such as that utilized in the exemplary member illustrated in FIG. 5, or comprised of a series of straight sections 601-603 such as that utilized in the exemplary member illustrated in FIG. 6. In at least one preferred embodiment, collars 115 and 139 are positioned on the axis of damper 131.

As illustrated in FIG. 2, the use of a nonlinearly-shaped member to couple the upper linkage, specifically link 105 in the embodiment illustrated in FIG. 2, to damper 131 and spring 121 allows the damper-spring unit to overlap tire 107. In the preferred embodiment, at least 50 percent of the width of mounting platform 119, spring 121 and damper 131 extend past inner tire plane 201 towards tire centerline 205. As a result of locating the damper-spring unit over the tire, the separation distance between the left vehicle and right vehicle damper-spring units is substantially increased over that achievable utilizing a conventional suspension, thereby providing increased passenger and/or luggage compartment space in this region of the vehicle. Furthermore, since the damper-spring unit is rotatably connected to support member 119, tire 107 can change camber, for example when the car travels over a bump, without imparting lateral force on the end of the assembly, thereby resulting in smoother damping.

FIG. 7 schematically illustrates the primary components associated with the damper-spring assembly 100. Spring 121, which may be a coil spring or an air spring, is positioned between mounting platform 119 and spring retaining member 125. Assuming a coaxial damper/spring assembly as preferred, damper rod 127 passes through the center of the spring and is attached to mounting platform 119. The entire assembly passes through, and is attached to, a portion 701 of the vehicle structure. Bushings 703 and 705, preferably rubber bushings, are interposed between vehicle body portion 701 and damper-spring assembly 100 as shown. Note that in the preferred embodiment, the damper and the spring are independently mounted to the vehicle structure, thus allowing a gap 707 to be formed between damper 131 and spring retaining member 125 as shown. By including gap 707 rather than rigidly coupling the damper to the spring, motion of the damper and spring are decoupled.

While the mounting configuration shown in FIG. 7 is preferred, it will be appreciated that the invention may utilize other mounting configurations. For example and as illustrated in FIG. 8, the damper-spring assembly may be mounted to the vehicle body at the top of the assembly. In such a configuration a bushing 801, preferably fabricated from rubber, is interposed between the damper 131 and vehicle body 803.

Figure 9:
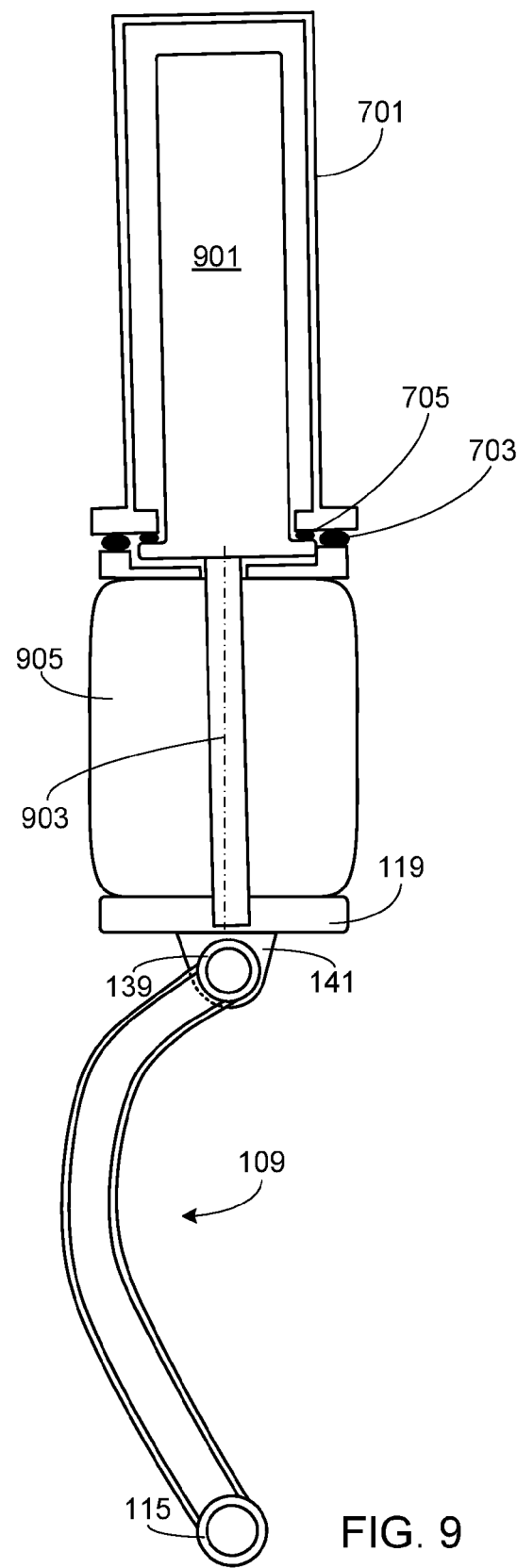
FIG. 9 illustrates a configuration in which the damper and spring are misaligned and offset from one another.
Figure 12:
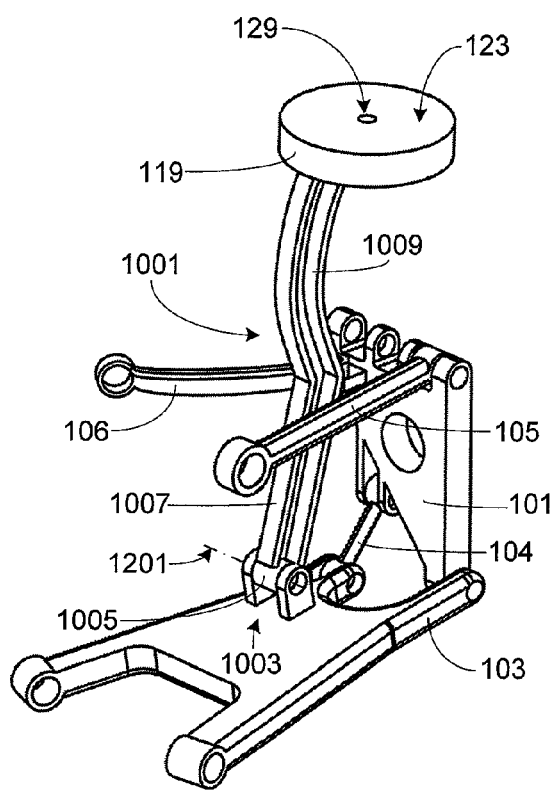
FIG. 12 provides a detailed perspective view of the linkage assembly of FIGS. 10 and 11, with the inclusion of the nonlinearly-shaped damper-spring support member.
Figure 13:
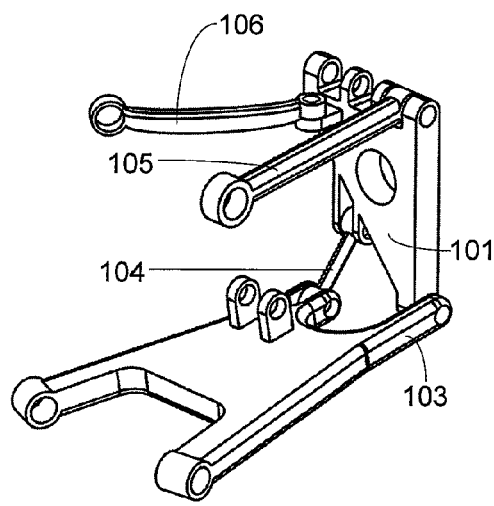
FIG. 13 provides a detailed perspective view of the linkage assembly of FIGS. 10 and 11, without the inclusion of the nonlinearly-shaped damper-spring support member.

In the embodiment described above, the spring and damper are coaxially mounted. In at least one embodiment, however, the axes of the spring and the damper are misaligned and offset from one another. FIG. 9 illustrates one such embodiment, this embodiment based on the configuration shown in FIG. 7. In this exemplary embodiment damper 901 is misaligned and offset relative to axis 903 of spring 905.

As previously noted, although coupling the damper-spring support member 109 to upper linkage arm 105 is preferred, the damper-spring support member may be connected elsewhere on the multi-link assembly. For example and as illustrated in FIGS. 10-13, the damper-spring support member may also be rotatably coupled to a lower linkage arm. In the embodiment illustrated in FIGS. 10-13, nonlinearly-shaped damper-spring support member 1001 passes between the upper linkage arms 105 and 106 and is rotatably connected to lower linkage arm 103 via a rotational connection generally designated 1003. Although a variety of rotational connections 1003 are contemplated that would allow member 1001 to pivot about the lower linkage, in the preferred and illustrated embodiment a bushing within collar 1005 of member 1001 is captured by a pin or bolt fastener (not visible), thus allowing the damper-spring support 1001 to rotate about axis 1201. In an alternate embodiment, rotational connection 1003 is comprised of a ball joint.

Figure 14:
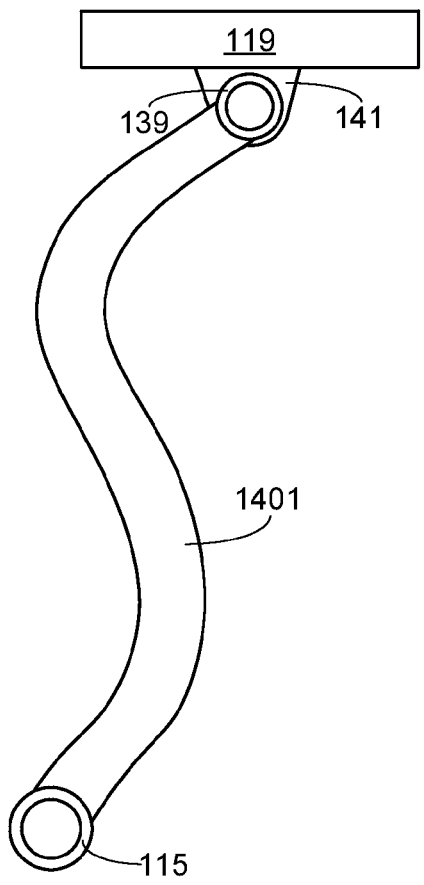
FIG. 14 provides a side view of an alternate damper-spring support member for use with the embodiment illustrated in FIGS. 10 and 11, where the alternate damper-spring support member is comprised of a continuously-curved element interposed between the rotational coupling and the spring platform.
Figure 15:
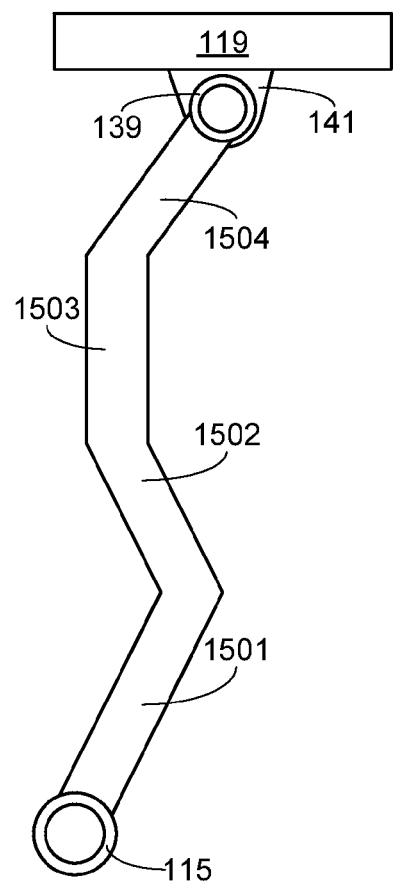
FIG. 15 provides a side view of an alternate damper-spring support member for use with the embodiment illustrated in FIGS. 10 and 11, where the alternate damper-spring support member is comprised of a series of straight elements interposed between the rotational coupling and the spring platform.

As in the previously illustrated embodiment, damper-spring support member 1001 is comprised of a straight portion 1007 and a curved portion 1009. It should be appreciated, however, that the shaped member may also be comprised of a continuously curved member 1401 such as that utilized in the exemplary member illustrated in FIG. 14, or comprised of a series of straight sections 1501-1504 such as that utilized in the exemplary member illustrated in FIG. 15.

Regardless of the exact shape of the nonlinearly-shaped damper-spring support member 1001, it is configured to cause damper 131 and spring 121 to overlap tire 107, preferably such that at least 50 percent of the width of mounting platform 119, spring 121 and damper 131 extend past inner tire plane 201 towards tire centerline 205. As a result of the overlap, the separation distance between the left vehicle and right vehicle damper-spring units is substantially increased over that achievable utilizing a conventional suspension, thereby increasing passenger and/or luggage compartment space.

It should be appreciated that while spring 121 and damper 131 are preferably coaxially mounted in the embodiment illustrated in FIGS. 10-15, the axes of the spring and the damper may be misaligned and offset from one another as illustrated in the embodiment shown in FIG. 9. Similarly, the order of the damper and spring in the damper-spring assembly may be reversed within any of the embodiments of the invention.

It should be understood that the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A wheel suspension system, comprising:
   a wheel support member positioned between an outer tire plane and an inner tire plane, wherein said wheel support member is configured to support a wheel-carrying spindle, and wherein said wheel support member includes a plurality of mounts;
   a plurality of rotatably connected linkage arms coupled to said plurality of mounts of said wheel support member;
   a nonlinearly-shaped damper-spring support member, wherein a first end of said nonlinearly-shaped damper-spring support member is rotatably connected to a first link of said plurality of rotatably connected linkage arms;
   a damper-spring mounting platform, wherein a second end of said nonlinearly-shaped damper-spring support member is rotatably connected to said damper-spring mounting platform, and wherein said nonlinearly-shaped damper-spring support member positions said damper-spring mounting platform above and at least partially overlapping a tire coupled to said wheel-carrying spindle mounted on said wheel support member; and
   a damper-spring assembly comprising a damper and a spring, said damper-spring assembly mounted to said damper-spring mounting platform and coupled to a vehicle body structure.

2. The wheel suspension system of claim 1, wherein at least 50 percent of a first width corresponding to said damper-spring mounting platform extends beyond said inner tire plane towards a tire centerline.

3. The wheel suspension system of claim 2, wherein at least 50 percent of a second width corresponding to said spring extends beyond said inner tire plane towards said tire centerline.

4. The wheel suspension system of claim 1, wherein said first link of said plurality of rotatably connected linkage arms is an upper linkage arm.

5. The wheel suspension system of claim 1, wherein said first link of said plurality of rotatably connected linkage arms is a lower linkage arm.

6. The wheel suspension system of claim 1, wherein said damper and said spring are coaxially mounted.

7. The wheel suspension system of claim 6, wherein said first end of said nonlinearly-shaped damper-spring support member is comprised of a first bushing collar, wherein said second end of said nonlinearly-shaped damper-spring support member is comprised of a second bushing collar, and wherein said first bushing collar and said second bushing collar are each positioned on a damper-spring assembly axis.

8. The wheel suspension system of claim 1, wherein a first portion of said spring rests on said damper-spring mounting platform, and wherein a damper rod passes through said spring and is coupled to said damper-spring mounting platform.

9. The wheel suspension system of claim 8, wherein said damper rod is bolted to said damper-spring mounting platform.

10. The wheel suspension system of claim 8, further comprising a spring retaining member, wherein said spring is captured between said damper-spring mounting platform and said spring retaining member.

11. The wheel suspension system of claim 10, wherein said spring and said damper are independently mounted to said vehicle body structure, and wherein said damper is spaced apart from said spring retaining member.

12. The wheel suspension system of claim 1, wherein said spring is comprised of an air spring.

13. The wheel suspension system of claim 1, wherein said spring is comprised of a coil spring.

14. The wheel suspension system of claim 1, wherein said damper is misaligned and offset relative to said spring.

15. The wheel suspension system of claim 1, wherein said wheel support member is positioned in-board of a tire centerline.

16. The wheel suspension system of claim 1, wherein an element interposed between said first end and said second end of said nonlinearly-shaped damper-spring support member is comprised of at least one straight segment and at least one curved segment.

17. The wheel suspension system of claim 1, wherein a continuously curved element couples said first end of said nonlinearly-shaped damper-spring support member to said second end of said nonlinearly-shaped damper-spring support member.

18. The wheel suspension system of claim 1, wherein an element interposed between said first end and said second end of said nonlinearly-shaped damper-spring support member is comprised of multiple straight segments.

19. The wheel suspension system of claim 1, wherein said first end of said nonlinearly-shaped damper-spring support member is comprised of a bushing collar.

20. The wheel suspension system of claim 1, wherein said second end of said nonlinearly-shaped damper-spring support member is comprised of a bushing collar.

* * * * *